June 13, 1944.  A. L. VAUGHN  2,351,242
POWER TRANSMISSION
Filed May 28, 1942  2 Sheets-Sheet 1
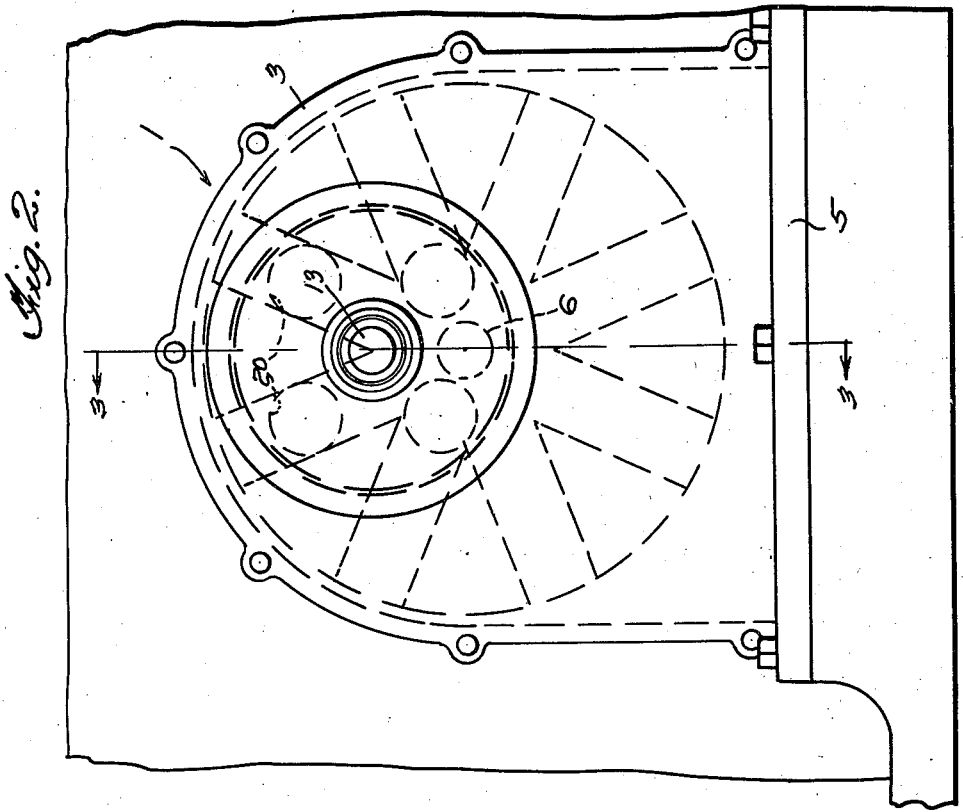
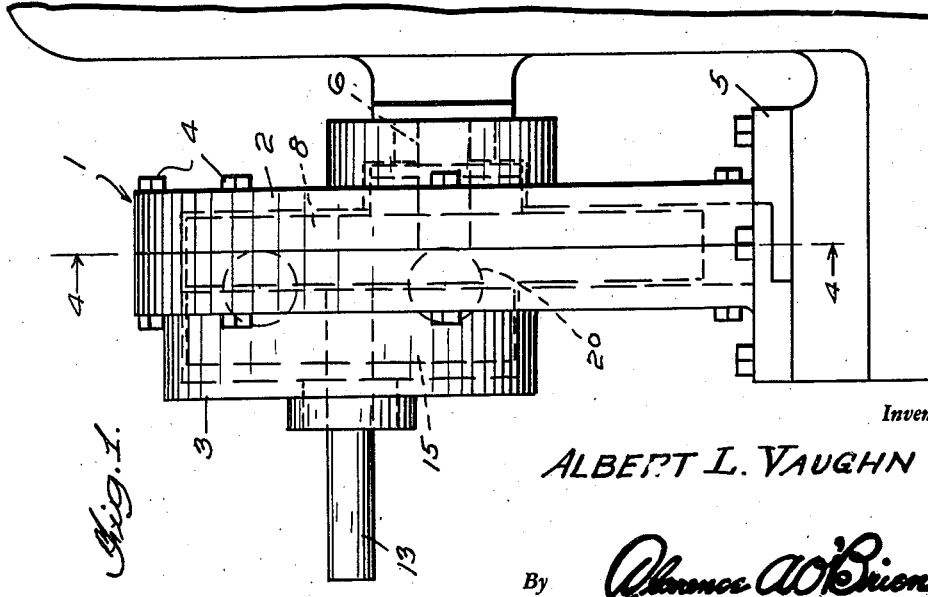
Inventor
ALBERT L. VAUGHN
By *Clarence A. O'Brien*
and *Harvey B. Jackson* Attorneys

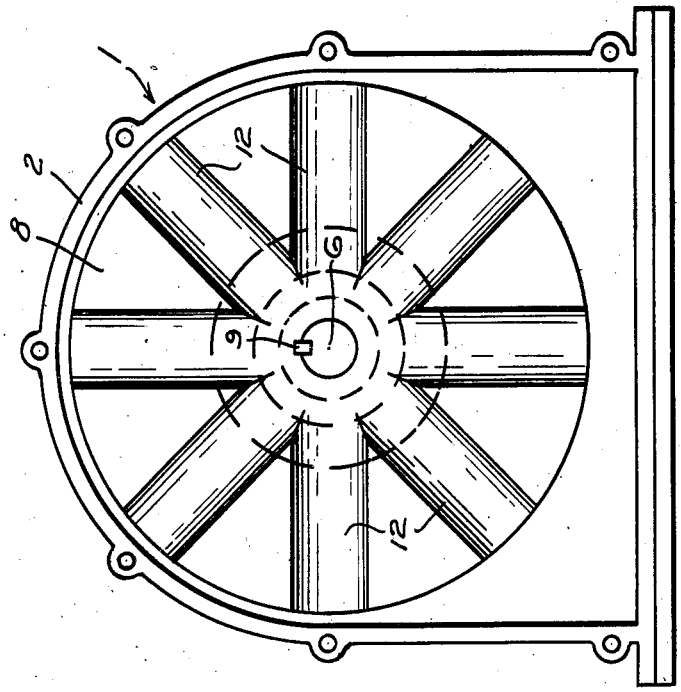
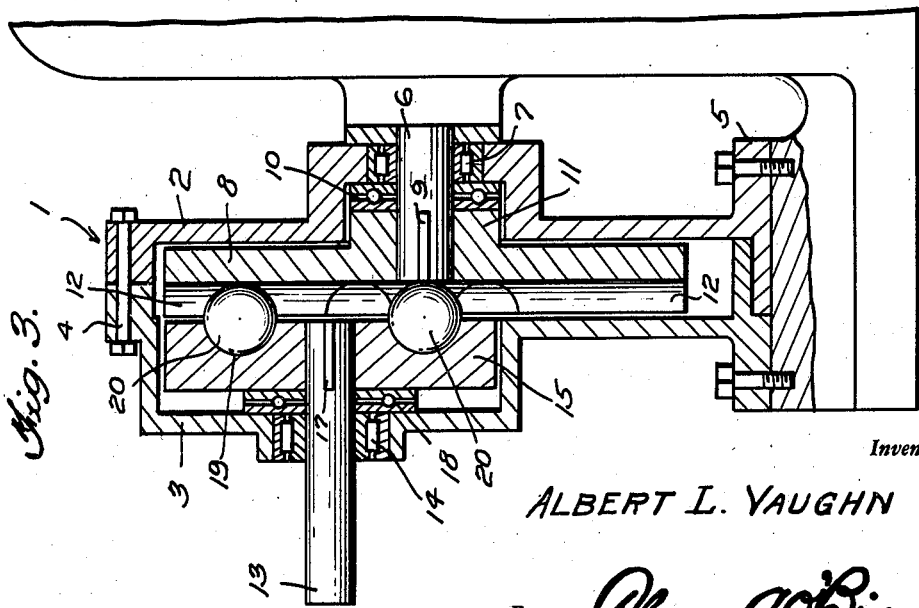

Patented June 13, 1944

2,351,242

UNITED STATES PATENT OFFICE 2,351,242

POWER TRANSMISSION

Albert L. Vaughn, Elko, Nev.

Application May 28, 1942, Serial No. 444,881

1 Claim. (Cl. 74—69)

The present invention relates to new and useful improvements in power transmissions, and has for its primary object to provide a device of this character comprising a unique principle of leverage whereby maximum efficiency and quiet operation will be had.

Other objects of the invention are to provide a power transmission of the character described which will be comparatively simple in construction, strong, durable, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a power transmission constructed in accordance with the present invention.

Figure 2 is a view in rear elevation of the device.

Figure 3 is a vertical sectional view, taken substantially on the line 3—3 of Figure 2.

Figure 4 is a view in rear elevation of the front portion of the transmission, looking from the line 4—4 of Figure 1.

Referring now to the drawings in detail, it will be seen that the embodiment of the invention which has been illustrated comprises a metallic housing 1. The housing 1 includes front and rear sections 2 and 3, respectively, detachably bolted together at 4, a base 5, et cetera.

A drive shaft 6 is journaled in the section 2 of the housing 1. A suitable radial bearing 7 is provided for the shaft 6. A fly wheel 8 in the form of a disk is keyed, as at 9, on the shaft 6 for operation in the housing 1. A suitable thrust bearing 10 is provided on the shaft 6 between the hub or central portion 11 of the fly wheel 8 and the opposed portion of the housing section 2. One face of the fly wheel 8 has formed therein a plurality of intersecting or communicating radial ball races or grooves 12.

A driven shaft 13 is journaled in a suitable radial bearing 14 in the housing section 3 at a point out of alignment with the shaft 6. A disk 15 is keyed, as at 17, on the driven shaft 13 for rotation in the section 3 of the housing 1. A suitable thrust bearing 18 is provided on the shaft 13 between the disk 15 and the outer wall of the housing section 3.

The disk 15 has formed in its inner face a plurality of sockets 19. The sockets 19 are spaced concentrically about the shaft 13. As illustrated to advantage in Figure 3 of the drawings, the sockets 19 are for the reception of balls 20.

The fly wheel 8 retains the balls 20 in the sockets 19. It will be noted that the balls 20 project into the races 12 of the fly wheel 8 and are operable in said races. Thus, the disk 15 is connected to the fly wheel 8 for actuation thereby. As the fly wheel 8 rotates the balls 20, which are held captive in their sockets 19, are caused to move inwardly in the races 12 and then outwardly in the next succeeding races.

It is believed that the many advantages of a power transmission constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A power transmission comprising a housing including a pair of detachably connected sections, one of said sections comprising a central circular protuberance having an outer end wall, a drive shaft journaled in said protuberance centrally of the latter, a disk fixed on the drive shaft and operable in the housing, said disk including a projecting hub portion operable in the protuberance, a radial bearing for the drive shaft in the protuberance, a thrust bearing for the disk between the hub portion thereof and the outer end wall of the protuberance, the other section of the housing having a second larger circular protuberance out of alignment with the first-named protuberance, a driven shaft journaled in the other protuberance of said other section of the housing centrally of the latter protuberance and longitudinally offset from the drive shaft, a disk centrally fixed on the driven shaft and operable in the second-mentioned protuberance of the housing in opposed relation to the first named disk, said first named disk having radial ball races in its inner face, the second named disk having sockets in its inner face at opposite sides of and equi-distant from its center, and balls journaled in the sockets and operable in the races for connecting the second named disk to the first named disk for actuation thereby, one of said balls being coincident with said drive shaft.

ALBERT L. VAUGHN.